Jan. 16, 1934.  C. MÜLLER  1,943,900
PICTURE TRANSMITTING APPARATUS
Filed Nov. 27, 1929   4 Sheets-Sheet 1
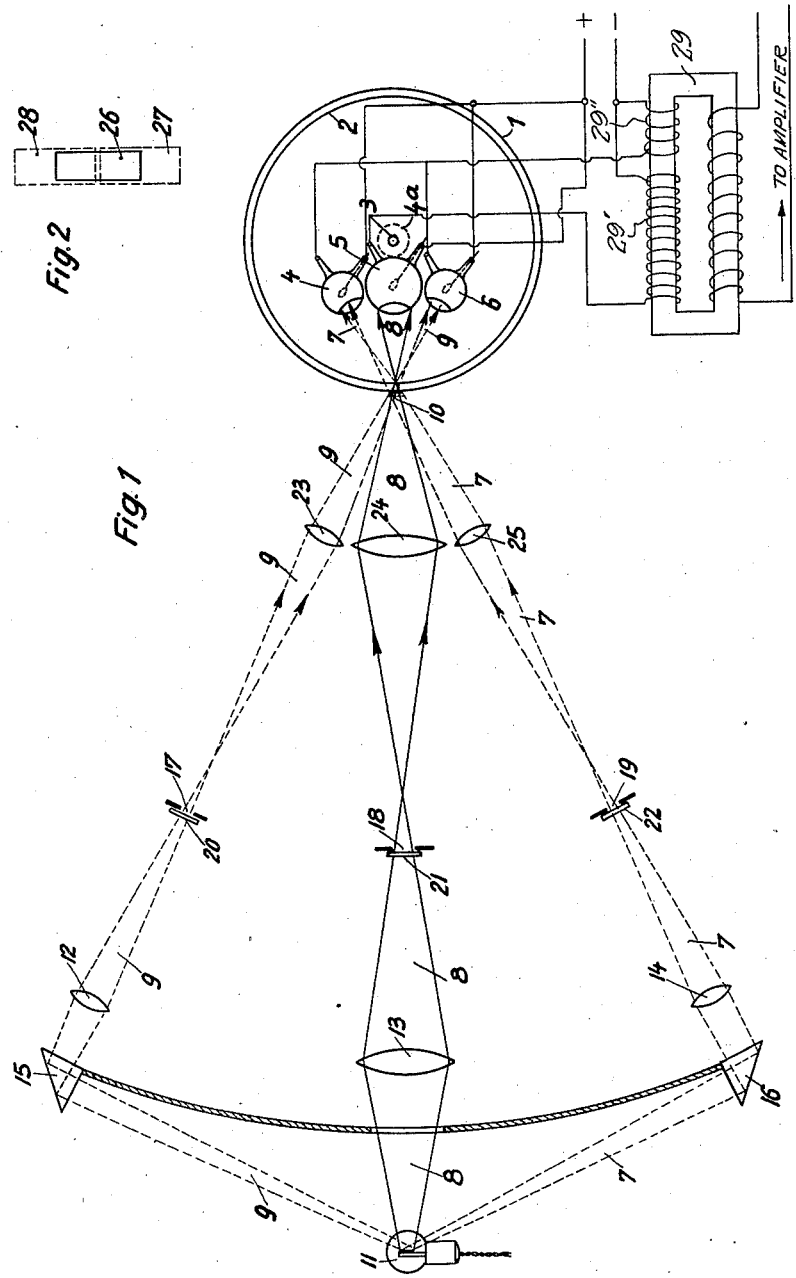
Inventor
Carl Müller

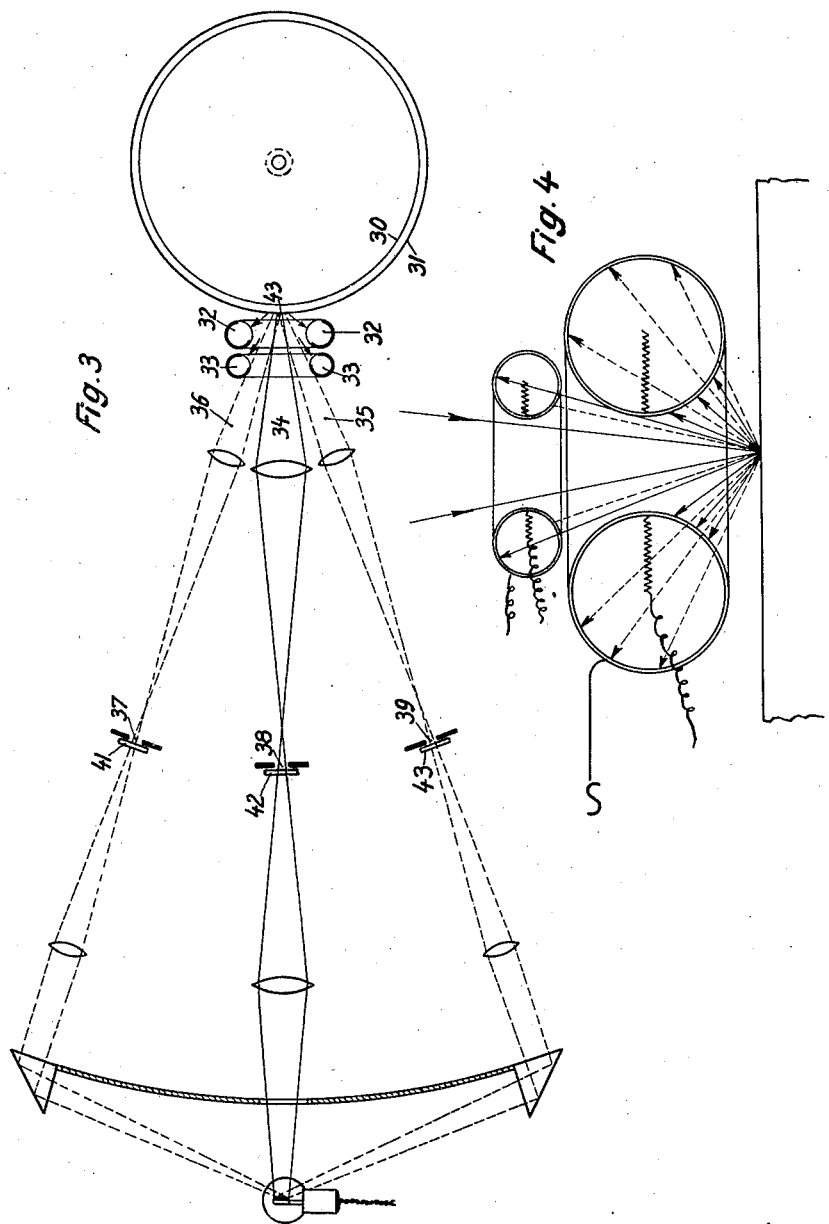

Jan. 16, 1934.  C. MÜLLER  1,943,900
PICTURE TRANSMITTING APPARATUS
Filed Nov. 27, 1929  4 Sheets-Sheet 3
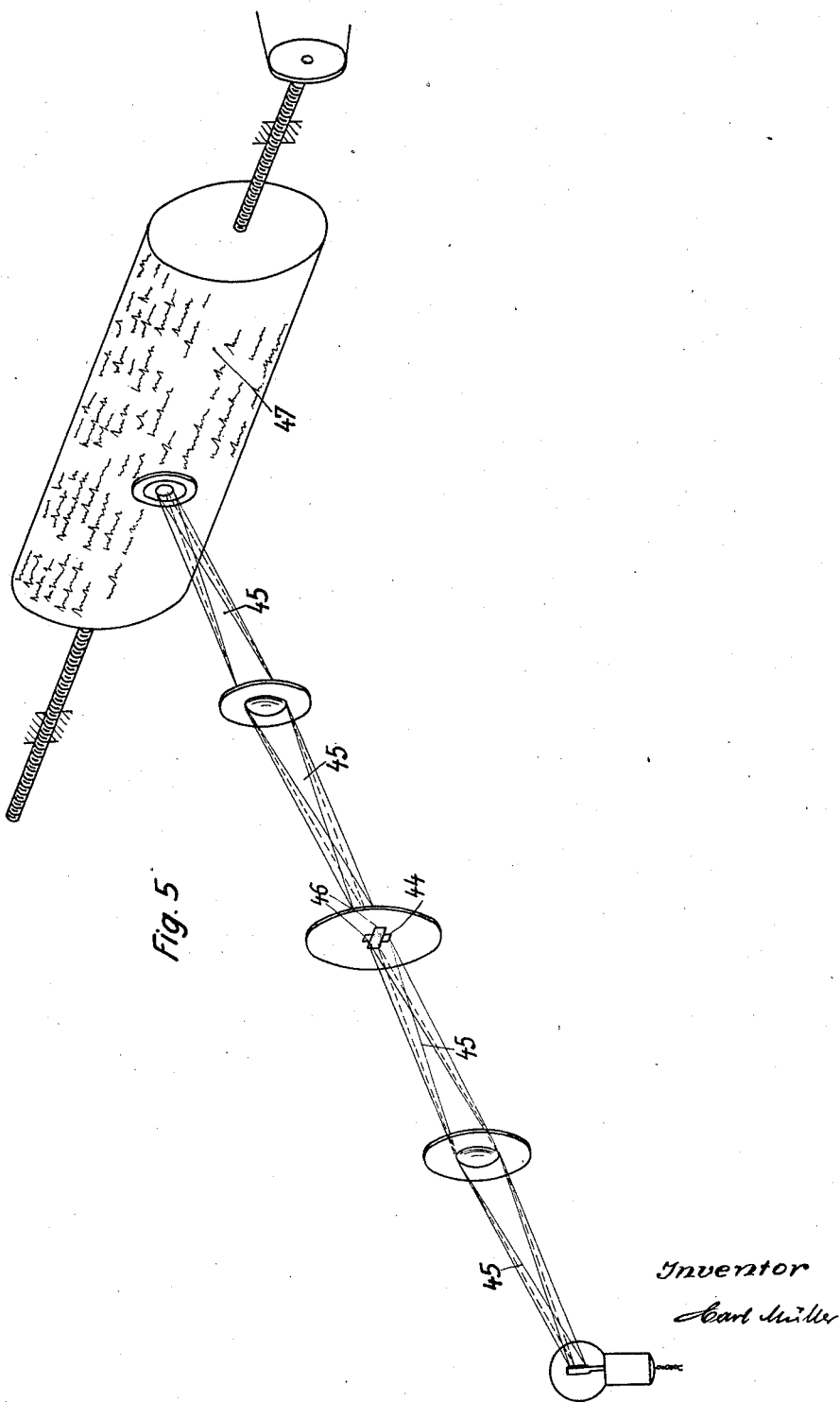

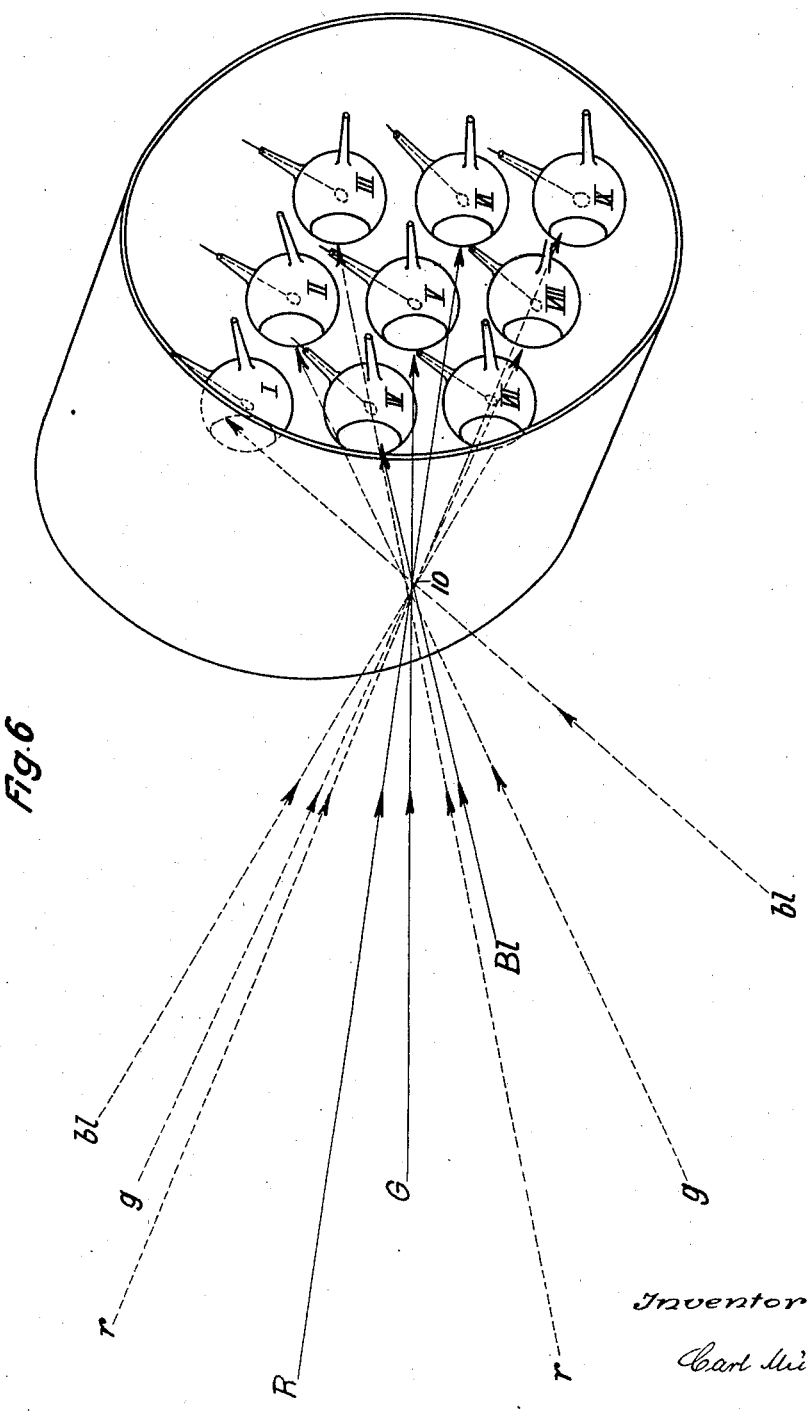

Patented Jan. 16, 1934

1,943,900

UNITED STATES PATENT OFFICE 1,943,900

PICTURE TRANSMITTING APPARATUS

Carl Müller, Berlin-Charlottenburg, Germany

Application November 27, 1929, Serial No. 410,223, and in Germany October 29, 1926

18 Claims. (Cl. 178—6)

My invention relates to a method of, and apparatus for, translating, by process of analysis, spatially or temporally successive energy forms into other energy forms and concerns, more particularly, a method of and means for electrically transmitting pictures.

In my co-pending application Ser. No. 309,373, filed October 1, 1928, of which the present application is a division and which is in part a continuation of another co-pending application Ser. No. 229,255 filed October 27, 1927, I have shown that a spectrum, i. e. a spatial succession of varying radiant energies, which is obliterated to a certain extent owing to the finite width of the spectroscope gap, may be correctly analyzed by a method comprising detecting the apparent value (primary value) of the radiation over a finite distance, which includes the point under consideration, and detecting the apparent values (secondary values) of the radiation over finite distances adjacent to that employed for the first-mentioned detection, and combining the values so obtained to get a result which is proportional to or dependent on a term compounded from said primary value and said secondary value.

If the primary value in any point is designated by $E\lambda$ and the secondary value by $E\lambda^+$ and $E\lambda^-$, the correct amount in any point sought is (1)    $E\lambda^\circ = A[E\lambda] - B(E\lambda^+ + E\lambda^-)$, wherein A and B denote constant coefficients which may easily be found by tests or calculations. If the widths of the measuring elements, i. e. the aforementioned distances, equal the width of the spectroscope gap, or in other words, the width of the area which a spectral line occupies in the obliterated spectrum, the coefficient A amounts to 7/6 and B to 1/14.

In order to obtain a still more refined result, I may detect the apparent values $E\lambda^{++}$ and $E\lambda^{--}$ (tertiary values) over finite distances adjacent to that used in the detection of said secondary values and may correctively combine them with the primary and secondary value, for instance as follows:

(2)    $C.E\lambda^\circ = E\lambda - D(E^+ + E\lambda^-) + F(E\lambda^{++} + E\lambda^{--})$ In this formula C, D and F denote again invariable coefficients which may amount to $$\frac{30}{37}, \frac{23}{222} \text{ and } \frac{1}{111}$$

respectively.

Although a detailed explanation of the calculation leading up to the Formulæ (1) and (2) has been given in my aforementioned co-pending application Ser. No. 309,373, I shall briefly show hereinafter how these formulæ were developed.

C. Runge, in Zeitschrift für Mathematik, 1897, page 206, has developed a method of calculation to compensate for the undesired but unavoidable integration which is due to the finite width of the spectroscope slib or gap, by using a differentiation based upon Paschen's equation, compare "Wiedemann's Annalen", vol. 60, 1897, page 712. This method has been extensively used by Paschen and others to correct the results of bolometric measurements of spectra. The calculation method of Paschen and Runge has for its object to find the corrected value of intensity, i. e., the value which would be obtained if a gap of infinitely small width, and a bolometer of infinitely small range, could be provided.

Their method is based upon observing by means of the usual bolometer and of a gap of a substantial width $a$; first, an intensity value $F(x)$ corresponding to a wave length $x$ and, second, the values $F(x-a)$ and $F(x+a)$ corresponding to the wave length $(x-a)$ or $(x+a)$, respectively, which are located to the right and to the left of the first measured point. In order to find the correct value $f(x)$ in the point of the wave length $x$, Runge developed the following progression:

$$a.f(x) = 2\left\{\frac{F(x)}{2!} - \frac{1}{4!}\Delta^2 F(x) + \frac{(2!)^2}{6!}\Delta^4 F(x) - \frac{(3!)^2}{8!}\Delta^6 F(x) \ldots - + (-1)^n \frac{(n!)^2}{(2n+2)!}\Delta^{2n} F(x) \ldots\right\} \quad (3)$$

The terms in this equation are intended to mean:

$\Delta^2 F(x) = \{F(x+a) - F(x)\} - \{F(x) - F(x-a)\}$ $\Delta^4 F(x) = \{\Delta^2 F(x+a) - \Delta^2 F(x)\} - \{\Delta^2 F(x) - \Delta^2 F(x-a)\}$ (4)

$\Delta^{2n} F(x) = \{\Delta^{2(n-1)} F(x+a) - \Delta^{2(n-1)} F(x)\} - \{\Delta^{2(n-1)} F(x) - \Delta^{2(n-1)} F(x-a)\}$ If the values $f(x)$ obtained by observation are measured in points spaced by the amounts $a$ from each other, this amount being equal to the width of the gap, the terms $\Delta 2F(x)$, etc., may be calculated by way of a successive formation of differences. However, if $f(x)$ is registered in form of a continuous curve, the following form of a row is preferable:

$$af(x) = F(x) - \frac{1}{6}F_1(x) + \frac{2}{45}F_2(x) - + \ldots \quad (5)$$

wherein $$F_1(x) = \frac{F(x+a) + F(x-a)}{2} - F(x) \quad (6)$$

and $$F_9(x) = \frac{F_1(x+a) + F_1(x-a)}{2} - F_1(x) \quad (7)$$

Paschen adopted the following course in order to correct his bolometrical observations, or, in other words, to correct the curves obtained. He diagrammatically represented the intensities $F(\lambda)$ as a function of the minimum deviation $\lambda$, and on the basis of the curve obtained, he calculated the correct value $F_1(\lambda)$ for every single point. Subsequently, the values $F_1(\lambda)$ were graphically recorded and from this new curve the terms $F_2(\lambda)$ were in a similar manner calculated for all points. Finally, the terms $af(\lambda)$ were calculated by means of formula 3 on the basis of the terms $F_1(\lambda)$, $F_2(\lambda)$ so found.

For the sake of simplicity and clearness, in the following the letter $\lambda$ may designate the wave length, the desired corrected intensity may be designated by $E^\circ\lambda$, the directly measured intensity corresponding to the wave length $\lambda$ may be called $E\lambda$. The width of the spectroscope gap may correspond to that of the bolometer and may amount to $a$. The secondary intensities measured at the points in which the wave length amounts to $(\lambda-a)$ and $(\lambda+a)$ may be called $E^+\lambda$ or $E^-\lambda$, respectively, corresponding to the above mentioned terms $F(x+a)$ and $F(x-a)$. In a similar manner, $E^{++}\lambda$ and $E^{--}\lambda$ designate those intensities of radiation directly measured in the points which are spaced from the point of $\lambda$ by $2a$ to either side. They correspond, as is obvious, to the aforementioned terms $F(x+2a)$ or $F(x-2a)$, respectively.

The following considerations are based upon the fact that for nearly all practical purposes it is sufficient to know the correct ratio of the intensities corresponding to the various wave lengths.

I have found that Runge's formula, if limited to include the correction terms of the first order only, i. e., the correction terms based upon the first adjacent points $(a)$ and $(-a)$, may be transformed to read as follows:

$$\frac{6}{7}E^0\lambda_1 = E\lambda_1 - \frac{1}{14}(E\lambda_1^+ + E\lambda_1^-) \qquad (8)$$

or $$E^0\lambda_1 = \frac{7}{6}\left[E\lambda_1 - \frac{1}{14}(E\lambda_1^+ + E\lambda_1^-)\right] \qquad (8a)$$

This formula relates to the wave length of $\lambda_1$. Accordingly, the formula relating to another wave length $\lambda_2$ would read:

$$\frac{6}{7}E^0\lambda_2 = E\lambda_2 - \frac{1}{14}(E\lambda_2^+ - E\lambda_2^-).$$

The above mentioned detailed Formula 3 may be transformed in a similar manner, including the correcting terms of first and second order to read as follows:

$$\frac{30}{37}E^0\lambda = E\lambda - \frac{23}{222}(E\lambda^+ + E\lambda^-) + \frac{1}{111}(E\lambda^{++} + E\lambda^{--}) \qquad (9)$$

If the coefficients in Formulæ (8a) and (9) are replaced by A, B, C, D or F respectively, as defined hereinbefore, it will be seen that the Formulæ (1) and (2) will be obtained.

I have found that the principle explained heretofore which resides in the method of compensating for the undesired effects produced by the finite resolution in the analyzing process by varying the translated response from one elemental unit of energy in accordance with that derived from energies of the second or third order offers particular advantages in its application to the transmission of pictures. It is well known in the art that the problem of obtaining a refined resolution of the picture to be transmitted offers considerable difficulties on account of the necessity to employ a scanning beam of a substantial width. The primary object of my invention is to improve the resolution of the picture with a scanning beam of given dimensions thereby permitting to either increase the speed of transmission without correspondingly curtailing the degree of resolution or to improve the resolution with a given speed of transmission.

Other objects of my invention, the features of novelty, and various manners in which the same may be performed, will appear from the description following hereinafter which, however, is intended to explain and not to limit the scope of the invention defined in the appended claims.

In the drawings

Fig. 1 illustrates an apparatus for picture transmission (sending station),

Fig. 2 is a diagrammatic illustration of the overlap of the scanning lights,

Figs. 3 and 4 diagrammatically illustrate a modified form of the system shown in Fig. 1, Fig. 5 diagrammatically illustrates another embodiment of the invention for picture transmission, and Fig. 6 diagrammatically illustrates a system for colored picture transmission.

My invention has to do with the transmission of images, e. g., television. Such transmission is usually effected by scanning the picture to be transmitted point by point or line by line. This scanning may be performed by a ray controlling a photoelectric element in accordance with the transparency or the reflecting properties of the particular point scanned. In the photoelectric element or elements an electric current is caused to flow dependent upon the characteristic of the light at the corresponding portion of the image. The current is transmitted to the receiving apparatus and is transformed into optical fluctuations which are composed into an integral image by means of a suitable apparatus running synchronously with the sending apparatus. The primary difficulty encountered in these methods resides in the necessity of making the individual portions or units of the image relatively large so as to obtain the desired speed in transmission by means of a single scanning ray in the sending apparatus. However, if these portions are too large, the details of the image are obliterated in the transmission. If they are too small, the electric energy available for the transmission is too small and an excessive time is required for scanning an image of a certain size.

My invention is based upon the consideration that the requirements for scanning a line or stripe-shaped portion of the image are essentially the same as for the spectral analysis, since in this case also it is desirable to obtain as undistorted an analyzation as possible in order to record the details of the graduation in intensity of radiation. The reduction in the width of the slot of a spectroscopic apparatus with a view to securing a correct analysis of the details of graduation has the same disadvantages as the reduction in the size of the image element. In both cases the intensity of radiation is reduced.

The principle of my invention resides in compensating for the undesired effects produced by the finite resolution in the analyzing or scanning process by effecting the translated response from one elemental unit in accordance with the response derived from an adjacent unit or units. In other words, the transmission of the primary energies is affected by the secondary adjacent energies by means of suitable sending or receiving apparatus or both.

Better to illustrate the advantages of my invention when applied to picture transmission and the like it may be assumed that the image to be transmitted be the record of a spectrum. In the sending apparatus this image is scanned by suitable means responsive to the differences in the characteristics of the light reflected by the successive units of the image. Such means may comprise, e. g., a photoelectric cell or even a thermo-element. In this case the successive units of the spectrum are successively scanned and the resulting current impulses are transmitted to the receiving apparatus wherein, by suitable optical means, they are successively composed into an equivalent image. If the scanning ray or the equivalent scanning device is made of the same width as the slot which has furnished the spectrum, e. g., .1 mm., the intensity available is relatively small and, as a consequence, the transmission cannot be performed but very slowly. If the width of the scanning ray and the corresponding width of the spectroscopic slot is doubled, the intensity is increased in proportion to the square, i. e., to four times that of the previous intensity, whereby the speed of transmission may be accordingly increased. However, the details in the graduation of the spectrum are obliterated on account of the wide scanning ray and the wide spectroscopic slot. It follows that prior methods involve the serious disadvantage that the speed in transmission is paid for by the loss of the details of the image so that in the receiving apparatus the graduation of the spectrum is recorded as a blurred or entirely obliterated graduation.

One object of my invention is to make possible the use of a wide scanning ray or, generally speaking, of a broad scanning range without the disadvantage of losing the details of the image. This object is attained by correcting the translated response from one elemental unit by means of the adjacent elemental units. This correction may be performed in various manners:

(a) It may be performed in the sending apparatus by correcting the graduation blurred or obliterated on account of the broad scanning range, e. g., through the intermediary of secondary scanning ranges functioning in a similar manner as did the secondary thermo-elements in my copending application. The succession of the electric impulses so connected and increased may be transmitted to the receiving apparatus in the ordinary manner.

(b) In the sending apparatus a broad scanning range is used for increasing the energy and the succession obliterated on account of the broad scanning range is transmitted to the receiving apparatus and, then, corrected and refined by subjecting each elemental unit to the influence of the adjacent units.

The second way outlined under (b) offers the advantage that the transmission and amplification of the electric impulses may be performed in a relatively simple manner because they do not include subtle fluctuations in the intensity. Only those fluctuations are necessary which, if recorded in the form of a curve, would be represented by steep peaks and valleys. Owing to the absence of subtle variations in energy, the transmission may be performed by means of wireless apparatus involving the use of high frequency restricted to a narrow band.

The principle of refining the graduation can be applied to converting spatially successive energies into temporarily successive energies and viceversa, but only if the condition is complied with that adjacent energy units overlap each other in the same manner as in an obliterated spectrum. This condition exists at a sending station where the images are scanned because even a highly concentrated scanning ray covers a certain area of the image which will never be equal to an ideal unit of uniform light characteristics but, as a rule, comprises heterogeneous distribution of intensity. Nevertheless, this unintended admixture of the radiation from adjacent ranges does not exactly correspond to the best operating conditions for the analyzing receiving apparatus, particularly as far as extension, distribution and relation of the secondary ranges with regard to the primary range of radiation are concerned. The desired accurate light distribution over the unit confined by the scanning ray may be produced in the manner to be hereinafter set forth.

It is to be noted that the Formulæ (1) and (2) are computed only for spectral graduations of intensity and may therefore be replaced by better formulæ, if they are to be applied to graduations or distributions of energy of a different nature. In the case of picture transmission of images having distinct and sharp contrasts in brightness, such as documents for instance, preferably other ratios of admixture of secondary energies and formulæ constituting more efficient combinations of correcting terms may be used. In order to provide for a convenient way of trying out the most favorable relations under consideration of the particular conditions prevailing, I prefer to make adjustable the rate of admixture and the rate of the correcting effects upon the sending apparatus as well as upon the receiving apparatus. Sometimes it is useful to combine several primary units with secondary units.

In the following an example shall be described which is based upon the above-mentioned method (a), and makes possible picture transmission with the aid of powerful energies.

In this example the image to be transmitted is formed by a transparent black-and-white picture through which the scanning ray of the sending station passes to a photoelectric cell on which rectified alternating current is impressed. The ray is intermittently cut off by a rotating perforated screen (not shown) arranged in front of a source of light. A sending apparatus adapted for this purpose is shown in Fig. 1, only so much being shown as is necessary for a clear understanding of the invention.

The transparent picture to be transmitted which, as far as possible, must be free from grain, and which may either be black and white or suitably colored, is carried on the periphery of a transparent glass drum 2 supported in a well known manner upon a threaded spindle 3 which is rotatably held by stationary threaded nuts and which is driven by any suitable means. During its rotation the drum is displaced in an axial direction. Enclosed in the drum 2 there are three photoelectric cells 4, 5 and 6 adjacent to each other. The cells are of any suitable construction, for instance, of the well known type developed by Elster and Geitel. Three separate rays or beams 7, 8 and 9 scanning the picture or film along a helical line 10 are pointed toward the cells from different directions. Each beam 7, 8 and 9 is confined and directed by an individual slot system in such a manner as to be concentrated upon the line 10 in the form of a short line of light, the intensity of which decreases from the middle toward its ends. The means for confining and directing the beams comprise a common intense source of light 11, e. g., a tungsten filament lamp, lenses 12, 13, 14, totally reflecting prisms 15, 16 to divert the beams upon the three slots 17, 18 and 19, formed by suitable screens. In front of the source of light the above mentioned perforated rotatable screen (not shown in the drawings) is arranged. 20, 21, 22 designate so-called wedged screens which are adjustable and serve to absorb variable parts of the light passing through the same, depending on their adjustment. 23, 24 and 25 are lenses which project optical images 10 of the slots 17, 18 and 19 in the form of the above-mentioned lines of light upon the drum 2.

The three scanning lines of light 10 formed by the beams do not completely coincide but preferably overlap each other, as diagrammatically shown in Fig. 2. The primary or central line of light generated by the central beam is represented by a rectangular parallelogram 26 in full lines. The overlapping secondary or adjacent lines of light produced by the oblique beams are shown as parallelograms 27 and 28 in dotted lines.

If each line or stripe-shaped portion of the image is scanned by a plurality of overlapping lines of light, each of which is of decreasing intensity towards its ends, the three photoelectric receivers are influenced in a similar manner as the three thermo-elements of the spectroscope described in my co-pending application Ser. No. 309,373, which are controlled by the powerful but blurred spectrum formed by a plurality of imaginary superimposed spectra displaced with respect to each other. Each of the thermo-elements is controlled not only by the small spectral radiance which would be active if an infinitely narrow slot were used, but owing to the width of the slot it is influenced also by part of the imaginary superimposed spectra of the adjacent spectral ranges of decreasing intensity. A mathematical analysis of the mixture of intensities has already been developed in 1897 by Paschen (compare the periodical "Annalen der Physik"). Owing to this mixed effect of adjacent ranges, a powerful energy is available for the generation of the spectrum or transmission or analysis of images, respectively. It is apparent from these considerations that each of the three photoelectric receivers 4, 5 and 6 in the present embodiment is exposed to a grades mixture of radiant intensity. This holds good even if the scanned portion of the image were homogeneous, since the rays of the middle part of the line of light constituting the scanned portion proper are increased by the amplifying rays of the lateral parts.

This additional energy is not lost in the course of the subsequent correcting control of the primary cell by the secondary cells, as a small fraction only of the correcting terms is combined with this primary energy (compare Formula 1).

The decrease in intensity along a line of light viewed from the centre of the line towards its ends may be provided for by placing in front of each of the slots 17, 18 and 19 (which are projected on a smaller scale on the drum 2 by means of the lenses 25, 24, 23), a photographically produced double wedge filter which in its centre is pervious to that spectral range to which the cell is sensitive and absorbs said rays to an increasing degree towards its ends. The filters are preferably exchangeable or transversely displaceable with respect to the slot, and their transparency is graded in the direction of their displacement.

Furthermore, screens having a confining opening may be inserted in the beams, e. g., 17, 18 and 19. In this manner the corrective fractions effective upon the secondary cells 4 and 6 may be varied many ways. Instead of using a single source of light, a plurality of separate adjustable sources could be employed. The corrective co-operation of the three photoelectric receivers may be accomplished in a comparatively simple manner.

The modulated alternating current delivered by the primary cell 5 may be fed to the primary coil 29' of a suitable transformer 29 wound in a right-hand direction, while the modulated current delivered by the secondary cells 4 and 6 connected in shunt to each other is fed to a counteracting primary coil 29'' of the same transformer wound in a left-hand direction. The number of windings of the two coils is so designed that the left-hand coil is in a suitable ratio, e. g., of 1:7, to the right-hand coil. If these conditions are complied with, the combination of the correcting effects takes place in this part of the amplifying device without materially decreasing the powerful energy obtained by the action of the broad primary scanning beam.

Consequently, for the further amplification, transmission and reception, the same means and methods may be used which have been developed prior to my invention for the purpose of picture transmission television, and the like. The step of obtaining the corrective current fluctuations for the desired energization of the transformer is carried out in the following manner: After a clear transparent spot of the film 1 has been brought to the scanned place, the secondary beams are put out and the strength of the alternating current delivered by the secondary transformer coil is measured. Then only the secondary beams are caused to pass through the transparent spot of the film and the alternating current is measured again with a view to ascertaining its ratio to the current flowing with the primary beam turned on. If the ratio does not amount to the desired value given by the correction formula (in case of Formula 1 it is 1:7), the secondary sources of light are so regulated until the desired ratio is obtained. It may be mentioned that the undesired influence of the light dispersed from the cells and interfering with the operation of the other cells may be eliminated by well known optical means and by the use of materials which do not cause dispersion, e. g., films free from grain. With this object in mind I have found that preferably light of different colors may be used for the different beams, blue-green light, for instance, for the central primary beam, and yellow-green and red light for the secondary beams. Accordingly, for the primary cells an element is selected which is sensitive to the coordinated rays, such as potassium, while the secondary cells must be sensitive only to their respective rays and may contain rubidium or caesium. Photoelectric cells sensitive to red rays have been developed by the General Electric Company. The three cells 4, 5 and 6 may be covered by light colored filters pervious only to their coordinated range of rays so as to absorb any interfering radiation.

As a substitute for the three separate cells, a ring-shaped cell may be used as a secondary element which cell surrounds the primary cell.

This arrangement in which a plurality of scanning units and photoelectric receivers are mutually coordinated by means of rays having different wave lengths and, accordingly, different ranges of sensitivity, are of particular efficiency in such sending apparatus in which the scanning ray is reflected or dispersed by the image, as is the case, for instance, in the system developed by the Telefunken Company of Berlin.

In Figs. 3 and 4 I have diagrammatically illustrated a section of such an apparatus in which ring-shaped photoelectric cells of the kind used by Telefunken are arranged to permit scanning by means of overlapping primary and secondary scanning beams. 30 designates again the drum supported by a threaded spindle and carrying on its circumference the picture 31 which in this case, however, is black and white, impervious to light. In front of the drum 30, two ring-shaped ovate cells 32 are arranged in concentric juxtaposition, both cells being sensitive to the rays of different color and being coated with light filtering substances on the side near to the drum. The primary, larger cell 32, may be coated, for instance, with a blue-green filter coat and may contain potassium sensitive to these short-wave rays. The secondary, smaller cell 33, sensitive to yellow and red, is also coated with a suitable filtering substance pervious to such rays. The intermittent main beam 34 confined by a slot is projected from the left through the color filter 42 and the ovate opening enclosed by the cells, while two oblique secondary beams 35 and 36 are so projected through color filters 41 and 43 upon the drum as to form thereon, together with the primary beam, three lines of differently colored light, the lines overlapping each other on the image 31 in the spot 43 in a similar manner as described heretofore in connection with the transmission of the transparent picture.

The light reflected by the image is partially radiated upon the two cells 32 and 33, most of it being cast upon the primary cell 32 and the minor part only upon the smaller secondary cell 33. The latter constitutes the secondary receiver serving to furnish the relatively small energy for correcting the primary energy. For the purpose of clearly illustrating the arrangement, the ovate opening confined by the cells has been shown to be of substantial size. It is to be understood, of course, that for practical purposes the opening and the beams will be much smaller.

The walls of both cells near the drum are subjected to the diffuse dispersed reflected radiation of both kinds of rays, as is diagrammatically illustrated in Fig. 4. On account of the electric action of the coating provided on the cells and on account of the particular sensitivity of the cells to the respective rays, only those rays are active upon the cells which are respectively coordinated to the same. In other words, the primary cell 32 receives those rays only which originate in its coordinated primary source of light, and the secondary cell 33 is controlled only by the rays of the secondary beams. Each beam is concentrated upon the image at 43 in the form of a small line of light bright in its centre and decreasing in intensity towards its ends, the three lines overlapping each other. The two cells may be connected to two coordinated counteracting primary windings of the transformer in the same manner as described in connection with the transmission apparatus for transparent pictures.

While the above embodiment has been described for the sake of simplicity as involving the use of three separate beams, obviously the same effect may be obtained by means of the arrangement shown in Fig. 5 in which a single slot 44 is used. This slot is covered with a light filter 46 having different shades of color and is reproduced on the drum 47 by means of a single beam 45. The filter 46 is of such nature that the projection of the slot on the film equals the projection formed by the cooperating three beams in the arrangement of Figs. 3 and 4. Such a filter may be manufactured by taking on a suitable scale a colored photographic picture of the colored line of light produced by the three beams in Fig. 3. Preferably, a series of interchangeable filters of that kind are produced. Instead of one filter, a combination of several differently colored filters may be used, or prisms may be employed to separate the rays and to filter out the desired wave length.

In the picture transmission system heretofore described, only those secondary ranges have been combined with the primary range which are situated in the direction of movement of the scanning point in accordance with the helical movement of that point. It is to be noted, however, that those picture units may also be combined with the primary range which are situated to the right and to the left of the path of the scanning point. This provides the possibility of increasing the width of said path and of a correspondingly increasing of energy. It follows that the units surrounding the scanned picture unit may be used for the corrective effect.

My invention is applicable also to the transmission of colored pictures. For this purpose the apparatus shown in Fig. 1 may be used with a few modifications. This may be done, for instance, by scanning the picture with three beams R, G, B1 arranged in the same horizontal plane diagrammatically shown in Fig. 6 and formed by red, green and blue rays, respectively. These three-colored beams operate upon three photoelectric cells IV, V and VI arranged in horizontal juxtaposition, each being sensitive only to its corresponding ray. The secondary ranges are scanned by a similar group of beams operating upon a coordinated group of cells I to III, or VII, VIII, IX, respectively. In each of these groups the cells are also arranged in horizontal juxtaposition. The scanning lines of light produced by the three groups of beams coincide with each other and may each correspond in structure to that described in connection with Fig. 1.

In the following, some examples of the other method (b) may be described in which the picture is scanned by means of an intermediate wide beam and with a strong energy resulting therefrom. The obliterated fluctuations (modulated high frequency) so generated are transmitted without previous correction, the correction being accomplished in the receiving station. In this case the scanning may also be accomplished by means of single line of light the intensity of which is increasing toward its ends in a similar manner as was the case with any of the lines of light which overlap each other in the arrangements shown in Fig. 1 to 3. The corrective transformation in the receiving station may be carried out in various manners. One possibility consists in recording the obliterated succession of energies on a photographic plate by means of any of the well known receiving apparatus which transform the transmitted modulated current into light fluctuations. The photographic record is subsequently subjected to a second photoelectric scanning process by means of a multiple receiver, as shown in Figs. 1, 3 or 5, comprising a primary receiver controlled by a primary picture unit equalling in size the range covered by the scanning beam in the sending station, and a secondary receiver or receivers controlled by the secondary picture units adjacent to the primary unit. The modulated current obtained by the corrective combination of the primary effects and the secondary effects (e. g. in a transformer having several windings counteracting each other) controls an ordinary receiver which builds up the corrected picture by any suitable method. For this purpose any one of the well known receivers may be used, e. g. a Carolus-Kerr cell. In this manner an accurate picture is obtained showing all the details which could not be obtained prior to my invention unless a very fine scanning beam of small energy were used.

The picture units scanned from the received and recorded image to control the primary and the secondary receiving elements, however, need not overlap each other. They may be adjacent to each other because the picture units of the original image have already been combined by the action of the wide scanning beam in the sending station and are transmitted to the receiving station in a form which may be compared with that of an obliterated spectrum.

The repeated scanning and the improved recording of the image in the receiving station does not cause particular difficulties in design or operation, especially when used for a continuous transmission of news, since both recording steps are accomplished in the same manner. Furthermore, strong energies may be used for the second transmission which is confined to the receiving station, and to a large extent the same source of energy and recording means may be employed. If the transmission plant is to be intermittently operated, the generation of the primary and of the secondary photoprints or images may be carried out in succession by means of the same apparatus.

What I claim is:

1. In a system for transmitting a picture, the method of using a relatively wide resolving member to give effects corresponding to a theoretically fine resolving member which comprises selecting a unit of the picture adjacent to the unit under analysis and affecting the response from the unit under analysis by subtracting a response obtained from said selected unit.

2. In a system for analyzing a picture for transmission by means of a resolving member of finite dimensions, the method which comprises taking the integrated resolution corresponding to an elemental unit of the picture analyzed, subtracting from said resolution integrated resolutions corresponding to adjacent units of the picture and proportioning the effects of said adjacent resolutions on the first mentioned resolution to correct for the integrating action resulting from said finite dimensions.

3. In a system for analyzing a picture for transmission employing a finite resolving medium, the method of compensating for the undesired effects produced by the finite dimensions of said medium which comprises detecting the characteristics of each elemental unit of the picture under analysis, detecting the characteristics of adjacent units of the picture, translating said characteristics into electric energy and combining the translations corresponding to the said adjacent units of the picture in an opposite sense to that derived from the unit under consideration.

4. In a system for picture transmission, means comprising a member having relatively large dimensions for resolving said picture into elemental units, means including a photoelectric cell for translating the characteristics of each unit into corresponding electric currents, and means including a supplementary photoelectric cell for detecting the characteristics of adjacent units and means controlled by said last-mentioned means for reducing said translated currents to compensate for the undesirable effects produced by the large dimensions of said resolving member.

5. In a picture transmission system the method of analyzing a picture to be transmitted which comprises projecting a plurality of separate overlapping light beams on each elemental area of the picture in succession, conducting said beams to different light responsive devices, and subtractively combining the responses of said devices.

6. In a picture transmission system the method of analyzing a picture to be transmitted which comprises subdividing the picture into elemental areas, projecting on each area in succession a main analyzing beam and a plurality of supplementary analyzing beams, conducting said beams to different light responsive devices, and subtractively combining the responses of said devices.

7. In a picture transmission system employing an analyzing slot of finite width, the method of compensating for the undesirable integrating effects of said slot which comprises passing a main analyzing beam through said slot upon the elemental area of the picture to be transmitted, projecting simultaneously on said picture other beams which overlap the elemental area of the picture being transmitted, conducting said beams to different light responsive devices, and combining the responses of said devices.

8. In a picture transmitting system the method of analyzing elemental areas of a picture using a relatively wide analyzing slot which comprises projecting upon adjacent areas of the picture a plurality of analyzing beams which vary in intensity from the center to the edges thereof, conducting said beams to different light responsive devices, and combining the responses of said devices in such a manner as to give an analyzed response corresponding to a theoretically fine slot.

9. In a picture transmission system the method of analyzing a picture to be transmitted which comprises subdividing the picture into elemental areas, projecting on each area in succession a main analyzing beam, projecting upon each area supplementary analyzing beams which are of lesser intensities than that of the main beam, conducting said main beam and said supplementary beams to different light responsive devices, and subtractively combining the responses of said devices.

10. In a picture transmission system the method of analyzing a picture which comprises dividing the picture into elemental areas, projecting on each area in succession a plurality of analyzing beams each graded in intensity from the center to the edges thereof, conducting said beams to different light responsive devices, and subtractively combining the responses of said devices.

11. In a picture transmission system a main analyzing beam, supplementary analyzing beams, means for projecting said beams in overlapping relation on each elemental area of the picture in succession, several light responsive devices individually responsive to different of said beams and means for subtractively combining the responses of said devices whereby the speed of transmission of the picture may be greatly increased without correspondingly curtailing the degree of resolution.

12. In a picture transmission system a picture to be transmitted, an analyzing light source, means for advancing each elemental area of the picture in succession towards said light source, means for dividing the light from said source into a main analyzing beam, and supplementary analyzing beams, means for projecting the main beam centrally with respect to the elemental area being analyzed and for simultaneously projecting the supplementary beams laterally displaced with respect to the center of the said elemental area, several light responsive devices individually responsive to different of said beams and means for subtractively combining the responses of said devices whereby the speed of transmission of the picture may be greatly increased without correspondingly curtailing the degree of resolution.

13. In a picture transmission system a picture to be transmitted, an analyzing light source, means for advancing each elemental area of the picture in succession towards said source, means for dividing the light from said source into a main analyzing beam and a plurality of supplementary analyzing beams, means for projecting the main beam on the picture and centrally with respect to the elemental area being analyzed, and for simultaneously projecting the supplementary beams on said picture each overlapping a portion of the projected main beam, several light responsive devices individually responsive to different of said beams and means for combining the responses of said devices whereby the speed of transmission of the picture may be greatly increased without correspondingly curtailing the degree of resolution.

14. In a picture transmission system the combination of a source of light, means for dividing the light from said source into a main analyzing beam and a plurality of separate supplementary analyzing beams, means for projecting said beams in overlapping relation to one another upon an elemental area of a picture to be transmitted, a plurality of light responsive devices, each corresponding to one of the beams, and means for subtracting the responses of one from that of another one of said devices whereby the speed of transmission of the picture may be greatly increased without correspondingly curtailing the degree of resolution.

15. In a picture transmission system, a picture to be transmitted, means for projecting on each elemental area of the picture in succession and overlapping one another a main analyzing beam and a plurality of supplementary analyzing beams, said supplementary analyzing beams being of a different color from that of the main beam, a plurality of light responsive devices, the device for the supplementary beams being selective to the color thereof, while the device for the main beam is responsive to both the color of the main beam and the color of the supplementary beams, and means for subtracting the effect of the supplementary beam from that of the main beam.

16. In a picture transmission system, a picture to be transmitted, means for projecting on each elemental area of the picture in succession and overlapping one another a main analyzing beam and a plurality of supplementary analyzing beams, a plurality of annular shaped light responsive devices through the center of which said beams pass, one of said devices adapted to respond mainly to light from the main beam which is reflected from the elemental area under analysis, and the other of said devices adapted to respond mainly to the light from the supplementary beams reflected from said elemental area, and means for subtracting the effect of the supplementary beam from that of the main beam.

17. In a picture transmission system, a light source, an analyzing aperture positioned between said light source and the picture to be transmitted, means for bringing successive elemental areas of the picture into registry with said aperture, and means including a graded density screen positioned in the path of the light passing through said aperture, said screen having maximum transmission at the central portion and tapering off towards the sides to subtract the light reflected by one area from the light reflected by another area.

18. In a system for transmitting pictures in their natural colors, a plurality of main analyzing beams each of a primary color, a plurality of sets of supplementary analyzing beams each of a primary color, means for projecting all of said beams on each elemental area of the picture, with the main beams centrally disposed with relation to the elemental area being analyzed, and the supplementary beams laterally disposed over said area and overlapping the main beams, a set of selectively responsive light sensitive cells for the main beams and sets of selectively responsive light sensitive cells for the supplementary beams, and means for subtracting the responses of one of said cells from that of another cell whereby the speed of transmission of the picture may be greatly increased without correspondingly curtailing the degree of resolution.

CARL MÜLLER.